United States Patent [19]

Bader

[11] 4,121,607

[45] Oct. 24, 1978

[54] CONTROL VALVE FOR INSTALLATION INTO A PIPELINE

[75] Inventor: Horst Bader, Stuttgart, Germany

[73] Assignee: J. C. Eckardt AG, Germany

[21] Appl. No.: 503,872

[22] Filed: Sep. 6, 1974

[30] Foreign Application Priority Data

Sep. 6, 1973 [DE] Fed. Rep. of Germany ....... 2344911

[51] Int. Cl.² .............................................. F16K 1/20
[52] U.S. Cl. .................. 137/454.5; 137/527; 251/148; 251/298; 251/360
[58] Field of Search ................. 251/298, 309, 82, 148, 251/151, 152, 301, 304, 360, 314, 160; 137/527, 527.2, 527.4, 527.6, 527.8, 454.5, 454.2

[56] References Cited

U.S. PATENT DOCUMENTS

| | | | |
|---|---|---|---|
| 1,028,134 | 6/1912 | Raymaker | 251/301 |
| 1,286,672 | 12/1918 | Lindgren | 137/527.4 X |
| 2,454,072 | 11/1948 | Long | 137/527.8 X |
| 2,504,006 | 4/1950 | Davis | 251/82 |
| 2,556,904 | 6/1951 | Cline et al. | 137/527 X |
| 2,803,426 | 8/1957 | De Zurik | 251/309 X |
| 2,913,001 | 11/1959 | Maslow et al. | 137/527.4 |
| 2,969,492 | 1/1961 | Wheatley | 137/527.4 |
| 3,016,914 | 1/1962 | Keithahn | 137/527 X |
| 3,144,876 | 8/1964 | Frye | 137/527.8 X |
| 3,876,179 | 4/1975 | Baumann | 251/298 |

*Primary Examiner*—William R. Cline
*Attorney, Agent, or Firm*—Craig & Antonelli

[57] ABSTRACT

A fluid control valve including a housing clampable between pipe flanges of pipes leading to and from the housing. A valve module is detachably insertable in said housing and includes a valve duct having a cylindrical shaped seat surface and a pivotally mounted valve body having a curved surface conforming in shape to the seat surface. The valve body is pivotally mounted at an extension of the valve duct. The pivot axis for the valve body is spaced from the center of curvature of the valve seat surface.

33 Claims, 4 Drawing Figures

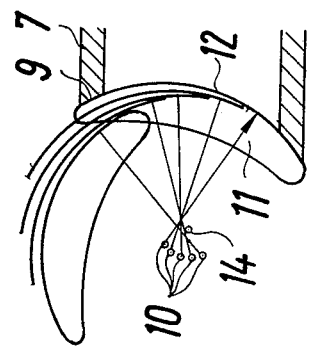
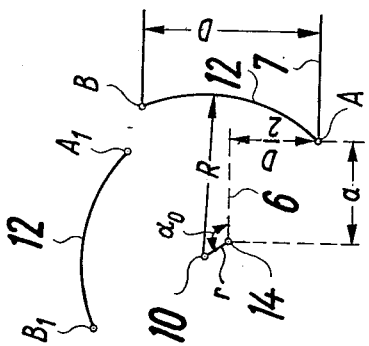
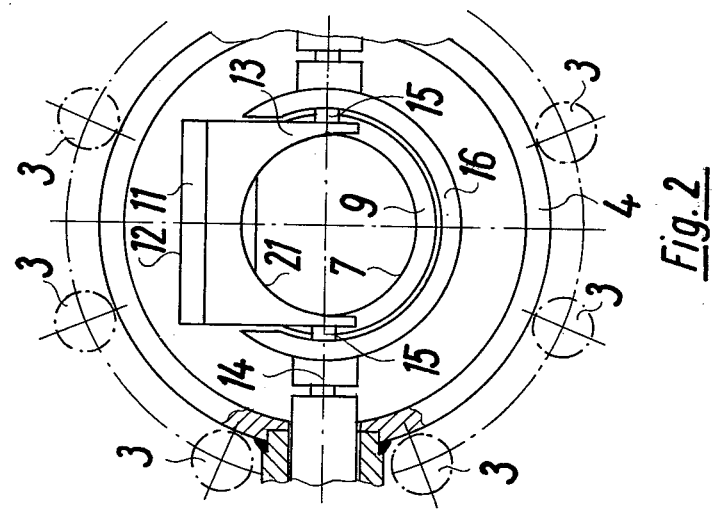

CONTROL VALVE FOR INSTALLATION INTO A PIPELINE

BACKGROUND AND SUMMARY OF THE INVENTION

This invention relates to a control valve which can be installed into a pipeline between two pipeline flanges and comprises a valve duct arranged in the interior of a housing. The mouth of this duct is fashioned as a valve seat curving convexly against the flow direction. A valve body having a sealing surface curved in the same direction and with the same radius as the valve seat is provided for this valve seat. This valve body is arranged to be pivotable about a pivot axis disposed outside of and in parallel to the axis of the cylindrical surface of the valve seat so that, in the closed position, the axes of the cylindrical surfaces of the valve seat and of the valve body are congruent.

In a conventional check valve (French Pat. No. 1,232,779), constituting a valve which opens in case of a pressure gradient positive in the flow direction and closes in case of a negative pressure gradient, the throttle element, provided with a cylindrical surface which curves convexly against the flow direction, is mounted in the housing with a pivot axis lying below the axis of the valve duct and below the axis of the cylindrical surface of the valve seat. The type of structure with a cylindrical surface curving convexly against the flow permits smaller dimensions than the likewise known type of structure wherein the cylindrical surfaces are curved concavely with respect to the flow direction, since in this type of construction the valve body must then be completely pivoted out of the range of the valve duct, so that the housing must have a large dimension in this portion. In the conventional type of structure, however, even the design with convex cylindrical surfaces does not yield favorable dimensions, since the valve housing must have a considerable bulge on the pivoting side of the valve body, although the latter cannot even be opened to such an extent that, in the completely open position, the valve body is no longer immersed in the flow cross section defined by the valve duct. The manufacturing expenses for such a valve are relatively high, expecially since narrow tolerances must be observed if sufficient tightness is to be obtained. Besides, considerable costs are, incurred if such a valve must be exchanged against another one, for example after a leak has developed.

The invention contemplates an arrangement which reduces the manufacturing expenses for a control valve which can be installed between two pipe line flanges, and furthermore which lowers the costs for replacement of such a valve. The invention further contemplates a control valve fashioned so that it can be utilized as a low-noise control valve having a sufficient control accuracy over a large range of its throughflow characteristic, determined by the permitted tolerances for linear or equal-percentage characteristic curves. The invention resides in part in that the valve body and the valve duct form a structural unit exchangeably arranged in the housing, for which purpose the valve body is disposed, with its pivot axis, in an extension of the valve duct projected past the valve seat. The manufacturing expenses are reduced with this arrangement, because the housing has only a subordinate importance for the functioning of the valve, so that no narrow (close) tolerances need be maintained in production of the housing. Moreover, the advantage is attained that, in case of repair or the like, only the structural unit formed by the valve body and the valve duct needs to be exchanged, without having to provide a new housing which, in most cases, consists of a very expensive material. The structural units or modules, which are also advantageous for storage purposes, can readily be tested for tightness individually in the manufacturing plant. Also, this construction makes it possible to provide the valve, by exchanging the module, with a different characteristic, without the expenditure being too excessive for this purpose.

In order to be able to keep the module, and thus also the housing dimensions, at a minimum in size, an advantageous embodiment of the invention provides that the pivot axis of the valve body, preferably intersecting the axis of the valve duct, is disposed below the axis of the cylindrical surface of the valve seat — as seen in the direction of the pivoting motion. This makes it possible to achieve a complete opening, where the pivot axis, in the axial direction, can be located relatively closely with respect to the valve seat, and the valve body, in the fully open position, does not project excessively beyond the cross section of the valve duct freed by the valve body.

In a further embodiment of the invention, it is provided to form, to keep the noise transmitted to the outside at a minimum, the inner surface of the valve body with a curvature, the apex line of which curvature extends in an extension of the valve duct in the fully open valve position. This creates a configuration of the inner surface of the valve duct which is favorable from the viewpoint of flow dynamics, this inner surface being likewise exposed to the flow of the medium in the open position. Thus, the flow cross section is not restricted and the noise generation can be kept at a minimum. In this construction, the inner surface of the valve body, in the open position, constitutes a limiting wall for the flow, covering dead spaces of the housing. For this purpose, it is furthermore advantageous if the valve body, in cross section, as seen in the flow direction has the configuration of an airfoil profile.

In order to further improve the flow conductance, it is advantageous to provide, as an extension of the valve duct, a sleeve extending preferably to the end of the housing and being provided, behind the valve seat in the pivoting zone of the valve body, with a longitudinal slot adapted to the width of the valve body. Thus, the flow is satisfactorily conducted also in the zone behind the valve seat by the sleeve. To establish a simple connection between the module and the housing, this invention further contemplates providing that the valve duct is threadedly inserted, with an external thread, in a threaded bore of an end wall of the housing. This invention further contemplates providing a centering ring extending into a tubular flange and threaded onto the external thread of the valve duct; which centering ring tapers with its projecting zone from the pipe diameter (of a pipe to be connected to the valve) to the diameter of the valve duct. In a further development of the invention, it is particularly advantageous to provide the housing with flanges on its end faces, by means of which the housing is clamped between the pipe flanges within a space defined by clamping bolts. Due to this arrangement, additional mounting means can be dispensed with, since the entire valve is aligned by the centering ring of the valve duct.

In a structurally advantageous embodiment of the invention, the housing consists of a tubular section disposed preferably concentrically with respect to the axis of the valve duct. This tubular section is provided with an end wall at the front and optionally also at the rear. The end walls then form the flanges contacting the pipe flanges and constitute a receiving means for the module made up of the valve duct and the valve body.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a view in the axial direction opposite the throughflow direction of a part of the valve of FIG. 1 in a completely open position;

FIG. 3 is a schematic side view of a further embodiment of the invention showing various control positions; and FIG. 4 is a schematic view for explaining dimensioning a control valve constructed according to this invention.

DETAILED DESCRIPTION OF THE DRAWINGS

Figure 1:
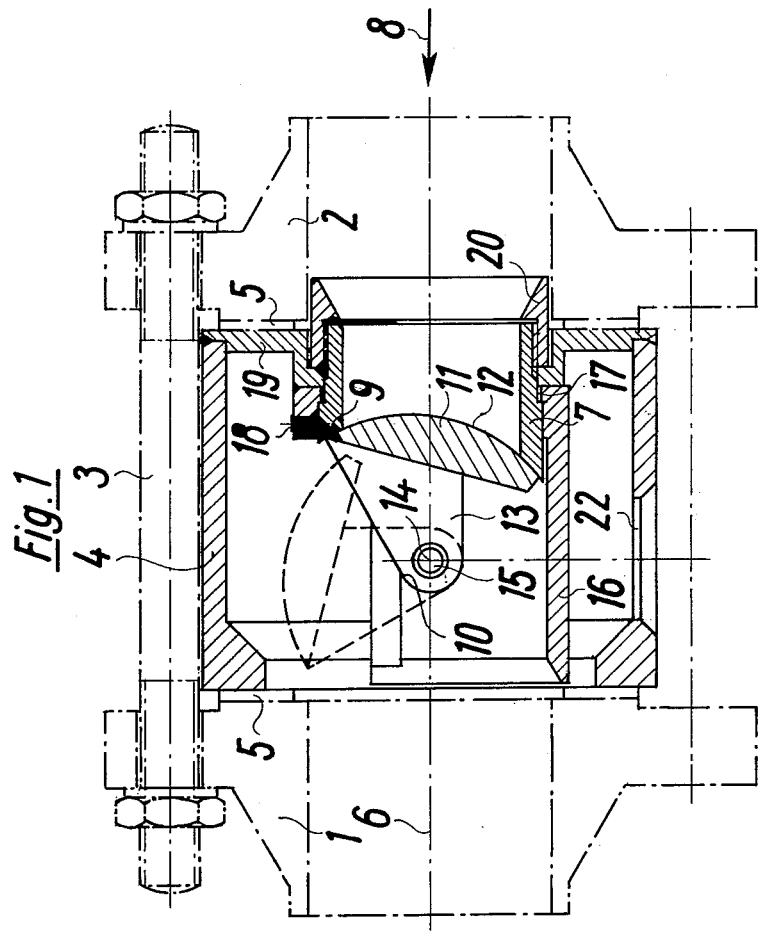
FIG. 1 is a side sectional schematic view of a control valve constructed according to the invention, shown clamped between two pipe flanges.

In FIG. 1, two pipe flanges 1 and 2 are illustrated in dot-dash lines, braced with respect to each other by clamping bolts 3, which are likewise shown in dot-dash lines. Within the annular space defined by the clamping bolts 3, a housing 4 of a valve is disposed which is clamped, with the aid of the clamping bolts, between the pipe flanges 1 and 2 with the interposition of sealing disks 5. The housing 4 is of a cylindrical configuration and is disposed concentrically to the axis 6 of the pipe flanges 1 and 2 and thus also concentrically to the pipelines, which latter are not shown.

The housing 4 accommodates the valve, which valve is fashioned as an exchangeable module. This valve consists of a valve duct 7, extending coaxially to the axis 6. The mouth of the duct 7 is fashioned as a cylindrical surface 9 curved convexly against the flow direction 8. The axis 10 of this surface (axis 10 being through the center of curvature of surface 9) extends transversally to the valve duct 7. The cylindrical surface 9, serving as the valve seat, is associated with a valve body 11 having a cylindrical outer surface 12 curved in a corresponding manner as surface 9.

The valve body 11 is pivotably mounted with arms 13 in a pivot axis 14 extending eccentrically to the axis 10, but in parallel thereto through the axis (centerline axis) of the valve duct 7. The valve body 11 is constructed so that the axis of its cylindrical surface 12 (center of curvature), in the illustrated closed position, is congruent with the axis 10 of the cylindrical surface 9 of the valve seat or with the mouth of the valve duct 7. The pivot axis 14 is formed by bearing pins 15 attached to the arms 13, these pins being held in bearings preferably produced from sintered metal.

The bearing pins 15 are accommodated in a tubular extension 16 of the valve duct 7 extending past the cylindrical surface 9, serving as the valve seat, in the flow direction 8 up to the end of the housing 4. The extension 16, the end of which is pointed or beveled toward the outside, is provided with a longitudinal slot in the zone wherein the valve body 11 is pivoted. The extension 16 is screwed onto an external thread 17 of the valve duct 7 and fixed with threaded pins 18 in a predetermined position against rotation.

The valve duct 7 serves as the supporting structure for the entire module. The duct 7 is threadedly inserted with its external thread 17 in an inner thread of an end wall 19 welded to the housing 4. The end wall 19 is offset in its threaded zone toward the interior of the housing, so that an annular space remains in which a centering ring 20 is mounted, which latter is likewise threaded onto the external thread 17 of the valve duct 7 and extends up into the pipe flange 2. The outer end of the centering ring 20, beveled in the manner of a blade, tapers in the flow direction from the inner diameter of the pipe flange 2 to the inner diameter of the valve duct 7. By exchanging one centering ring 20 for another, provided with a larger or smaller outer diameter in the zone projecting beyond the valve duct, it is possible to adapt the same valve to varying pipe diameters.

As mentioned above, the pivot axis 14 extends so that it intersects with the axis of the valve duct 7 and/or the sleeve serving as the extension 16, which is advantageous for manufacturing reasons. In order to obtain the feature that the pivot axis can be located relatively closely to the cylindrical surface 9 serving as the valve seat, so that the valve body 11 does not swing out too far in the upward direction, the axis 10 of the cylindrical surface 9 is arranged in the direction of the pivoting motion above the pivot axis 14 when the body 11 is in the closed position. Besides, this axis 10 is somewhat offset in the flow direction with respect to the pivot axis 14.

To prevent the flow from being inhibited by the opened valve body 11 and also to effect a flawless conductance of the flow on the inside of the valve body, the inner surface 21 of the valve body 11 is shaped, with the inner surfaces of the arms 13, in the manner of a tunnel, so that it corresponds approximately to the contour of the valve duct 7 in the opened position. This construction can clearly be seen from FIG. 2. Thereby, the dead space in the upper zone of the housing 4, when the valve is entirely opened, is extensively covered. The valve body 11 is adjusted by means of an adjustment drive mechanism, not shown, from outside of the housing 4, this mechanism being extended into the housing through a bore 22, the latter being shown in FIG. 1 offset by 90°. The adjusting drive mechanism can be connected with one of the two bearing pins 15, for example by a plug-in coupling.

The valve of the present invention permits a relatively simple manufacture, since no excessive requirements need to be met by the housing 4 with regard to manufacturing tolerances. Besides, a very compact design is made possible, resulting in a saving of material with regard to the valve parts, as well as with respect to the housing 4, which means an additional saving in costs. Furthermore, it is possible to exchange the module formed by the valve body and the valve duct in a simple manner and replace same by another one. It is also possible to fashion the valve duct 7 integrally with a part corresponding to the extension 16, or to provide the duct only with arms extending in the flow direction, wherein the bearing bolts 15 are supported.

The embodiment of FIG. 3 corresponds essentially to the embodiment of FIGS. 1 and 2. In order to obtain especially favorable flow conditions, especially in the partial-load range, the valve body 11 is shaped, in this example, as an airfoil profile, seen in cross section, so that a slam-free flow characteristic is obtained. The valve body 11 is illustrated in four different control positions, and it can clearly be seen that the valve body, in the completely open position, entirely frees the cross section of the valve duct 7 without immersing again into the cross section with its rear end. For the sake of simplicity, only the curved surface 12 and the associated radius are shown in the intermediate positions.

As mentioned previously, it is advantageous for the manufacturing process if the pivot axis 14 is disposed in the center of the duct so that a fixed initial value is produced. For spatial reasons, this initial value should stand for the maximum value, and all other values should fall below this maximum. So that the valve body 11 fully frees the cross section of the valve duct 7, does not enter again into the cross section at its rear end, and yet projects only slightly past the outer diameter of the valve duct 7, rendering the housing 4 accordingly compact, the distance $a$ to the point of intersection A between the radius R of the valve seat 9 and the inner diameter D of the valve duct 7 in the flow direction is to be between $\frac{1}{3}$ D and $\frac{2}{3}$ D; the radius $r$ between the pivot axis 14 and the axis 10 of the cylindrical surface 9 is to be between 1/10 D and $\frac{1}{4}$ D; whereas the angle $\alpha_0$ between the duct axis and a straight line extended from the pivot axis 14 to the axis 10 is to have a value of between 50° and 150°. In FIG. 4, $A_1$, $B_1$ depict the position of points A and B when the valve body is in a completely open position.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim:
1. A fluid control valve comprising:
    a housing,
    a valve duct arranged in the interior of the housing and extending in a predetermined flow direction, said duct including a mouth fashioned as a valve seat with a curved valve seat surface in the shape of a portion of a cylinder curving convexly against the flow direction with a center of curvature at an axis of the cylinder,
    a valve body provided with a curved valve body surface conforming in shape to said curved valve seat surface,
    valve body pivot means supporting said valve body for movement about a pivot axis in such a manner that said valve seat surface and valve body surface sealingly engage one another when said valve body is in a closed position, said pivot axis extending parallel to the axis of the cylinder and being spaced from the center of curvature of said valve seat surface, said pivot axis being at a fixed position during movements of said valve body from said closed position to an open position out of sealing engagement with said valve seat surface, said valve body pivot means being mounted in an extension of the valve duct which is spaced from the valve seat surface such that said valve duct and valve body form a valve unit, and
    mounting means for exchangeably attaching said valve unit to said housing,
    wherein said pivot axis intersects a centerline of said valve duct.
2. A valve according to claim 1, wherein, with the axis of the cylinder arranged in a horizontal plane, the pivot axis is located below the axis of the cylinder when the valve body is in said closed position with pivotal movements from said closed position being in an upward direction.
3. A valve according to claim 2, wherein said valve body has an inner surface facing away from said valve body surface which is configured so that an apex line of said inner surface lies in an extension of the inner surface of said valve duct when said valve body is in a completely open position.
4. A valve according to claim 2, wherein said mounting means includes an external thread on said valve duct which is threadably engageable with a threaded bore of an end wall of the housing.
5. A valve according to claim 1, wherein said valve body has an inner surface facing away from said valve body surface which is configured so that an apex line of said inner surface lies in an extension of an inner surface of said valve duct when said valve body is in a completely open position.
6. A valve according to claim 5, wherein a sleeve serves as the extension of the valve duct, said sleeve extending from said valve duct to the end of said housing which is downstream of said valve seat, and wherein said sleeve is provided with a longitudinal slot adapted to the width of the valve body for accommodating pivotal movement of the valve body.
7. A valve according to claim 1, wherein a sleeve serves as the extension of the valve duct, said sleeve extending from said valve duct to the end of said housing which is downstream of said valve seat, and wherein said sleeve is provided with a longitudinal slot adapted to the width of the valve body for accommodating pivotal movement of the valve body.
8. A fluid control valve comprising:
    a housing,
    a valve duct arranged in the interior of the housing and extending in a predetermined flow direction, said duct including a mouth fashioned as a valve seat with a curved valve seat surface,
    a valve body provided with a curved valve body surface conforming in shape to said curved valve seat surface and an inner surface facing away from said valve body surface which is configured so that an apex line of said inner surface lies in an extension of an inner surface of said valve duct when said valve body is in a completely open position,
    valve body pivot means supporting said valve body for movement about a pivot axis in such a manner that said valve seat surface and said valve body surface sealingly engage one another when said valve body is in a closed position, said pivot axis being spaced from the center of curvature of said valve seat surface and being located below the axis of the cylinder when the valve body is in the closed position with pivotal movement from said closed position being in an upward direction, said valve body pivot means being mounted in an extension of the valve duct which is spaced from the valve seat surface such that the valve duct and valve body form a valve unit, and mounting means for exchangeably attaching said valve unit to said housing, wherein a sleeve serves as the extension of the valve duct, said sleeve extending from said valve duct to the end of said housing which is downstream of said valve seat, and wherein said sleeve is provided with a longitudinal slot adapted to the width of the valve body for accommodating pivotal movement of the valve body.

9. A valve according to claim 8, wherein said mounting means includes interengaging threads at said valve duct and said housing.

10. A valve according to claim 8, wherein said mounting means includes an external thread on said valve duct which is threadably engageable with a threaded bore of an end wall of the housing.

11. A valve according to claim 10, wherein a centering ring is threaded onto the external thread of the valve duct, said centering ring tapering with its projecting zone from a predetermined pipe diameter to the diameter of the valve duct.

12. A valve according to claim 11, wherein said housing includes a tubular section disposed concentrically to the valve duct centerline, said tubular section being provided with front and rear end walls at respective opposite ends of said valve duct.

13. A valve according to claim 10, wherein the housing is provided with flanges at its end faces, further comprising clamping bolts for clamping said flanges of said housing between pipe flanges of pipes for accommodating flow of fluid to and from said valve duct.

14. A fluid control valve comprising:
a housing,
a valve duct arranged in the interior of the housing and extending in a predetermined flow direction, said duct including a mouth fashioned as a valve seat with a curved valve seat surface,
a valve body provided with a curved valve body surface conforming in shape to said curved valve seat surface and having an inner surface facing away from the valve body surface which is configured so that an apex line of said inner surface lies in an extension of an inner surface of said valve duct when said valve body is in a completely open position,
valve body pivot means supporting said valve body for movement about a pivot axis in such a manner that said valve seat surface and valve body surface sealingly engage one another when said valve body is in a closed position, said pivot axis being spaced from the center of curvature of the valve seat surface, said valve body pivot means being mounted in an extension of the valve duct which is spaced from the valve seat surface such that said valve duct and valve body form a valve unit, and
mounting means for exchangeably attaching said valve unit to said housing including an external thread on said valve duct which is threadably engageable with a threaded bore of an end wall of the housing,
wherein a sleeve serves as the extension of the valve duct, said sleeve extending from said valve duct to the end of said housing which is downstream of said valve seat, and wherein said sleeve is provided with a longitudinal slot adapted to the width of the valve body for accommodating pivotal movement of the valve body.

15. A fluid control valve comprising:
a housing,
a valve duct arranged in the interior of the housing and extending in a predetermined flow direction, said duct including a mouth fashioned as a valve seat with a curved valve seat surface,
a valve body provided with a curved valve body surface conforming in shape to said curved valve seat surface,
valve body pivot means supporting said valve body for movement about a pivot axis in such a manner that said valve seat surface and valve body surface sealingly engage one another when said valve body is in a closed position, said pivot axis being spaced from the center of curvature of said valve seat surface, said valve body pivot means being mounted in an extension of the valve duct which is spaced from the valve seat surface such that said valve duct and valve body form a valve unit,
mounting means for exchangeably attaching said valve unit to said housing including an external thread on said valve duct which is threadably engageable with a threaded bore of an end wall of the housing, and
a centering ring threaded onto the external thread of the valve duct, said centering ring tapering in its projecting zone from a predetermined pipe diameter to the diameter of the valve duct.

16. A valve according to claim 15, wherein said valve seat surface is in the shape of a portion of a cylinder with the center of curvature at the axis of the cylinder, and wherein said pivot axis extends parallel to said axis of the cylinder.

17. A valve according to claim 16, wherein said pivot axis is in a fixed position during movements of said valve body from said closed position to open position out of sealing engagement with said valve seat surface.

18. A valve according to claim 17, wherein said valve seat surface curves convexly against the flow direction.

19. A valve according to claim 15, wherein said mounting means includes an external thread on said valve duct which is threadably engageable with a threaded bore of an end wall of the housing.

20. A valve according to claim 19, wherein the housing is provided with flanges at its end faces, further comprising clamping bolts for clamping said flanges of said housing between pipe flanges of pipes for accommodating flow of fluid to and from said valve duct.

21. A valve according to claim 20, wherein said housing includes a tubular section disposed concentrically to the valve duct centerline, said tubular section being provided with front and rear end walls at respective opposite ends of said valve duct.

22. A valve according to claim 19, wherein said housing includes a tubular section disposed concentrically to a valve duct centerline, said tubular section being provided with front and rear end walls at respective opposite ends of said valve duct.

23. A valve according to claim 15, wherein the housing is provided with flanges at its end faces, further comprising clamping bolts for clamping said flanges of said housing between pipe flanges of pipes for accommodating flow of fluid to and from said valve duct.

24. A fluid control valve comprising:

a housing, a valve duct arranged in the interior of the housing and extending in a predetermined flow direction, said duct including a mouth fashioned as a valve seat with a curved valve seat surface, a valve body provided with a curved valve body surface conforming in shape to said curved valve seat surface, valve body pivot means supporting said valve body for movement about a pivot axis in such a manner that said valve seat surface and valve body surface sealingly engage one another when said valve body is in a closed position, said pivot axis being spaced from the center of curvature of said valve seat surface, said valve body pivot means being mounted in an extension of the valve duct which is spaced from the valve seat surface such that said valve duct and valve body form a valve unit, mounting means for exchangeably attaching said valve unit to said housing, and a sleeve serving as the extension of the valve duct, said sleeve extending from said valve duct to the end of said housing which is downstream of said valve seat, said sleeve being provided with a longitudinal slot adapted to the width of the valve body for accommodating pivotal movement of the valve body, wherein the housing is provided with flanges at its end faces, and clamping bolts for clamping said flanges of said housing between pipe flanges of pipes for accommodating flow of fluid to and from said valve duct.

25. A valve according to claim 24, wherein said housing includes a tubular section disposed concentrically to the valve duct centerline, said tubular section being provided with front and rear end walls at respective opposite ends of said valve duct.

26. A fluid control valve comprising:

a housing, a valve duct arranged in the interior of the housing and extending in a predetermined flow direction, said duct including a mouth fashioned as a valve seat with a curved valve seat surface in the shape of a portion of a cylinder curving convexly against a direction of flow with a center of curvature at an axis of the cylinder, a valve body provided with a curved valve body surface conforming in shape to said curved valve seat surface, valve body pivot means supporting said valve body for movement about a pivot axis extending parallel to the axis of the cylinder in such a manner that said valve seat surface and valve body surface sealingly engage one another when said valve body is in a closed position, said pivot axis being spaced from the center of curvature of said valve seat surface and being in a fixed position during movements of said valve body from said closed position to an open position out of sealing engagement with said valve seat surface, said valve body pivot means being mounted in an extension of the valve duct which is spaced from the valve seat surface such that said valve duct and valve body form a valve unit, and mounting means for exchangeably attaching said valve unit to said housing, wherein the valve duct is cylindrical and has an inner diameter D, with the spacing in the flow direction from said pivot axis to a point of intersection of a radius R of the valve seat surface and the diameter D being in the range of $\frac{1}{3}$ to $\frac{2}{3}$ D.

27. A valve according to claim 26, wherein a radius r between the pivot axis and the center of curvature of said valve seat surface is between 1/10 and $\frac{1}{4}$ D.

28. A valve according to claim 27, wherein a angle ($\alpha_0$) between the longitudinal centerline of a valve duct and a straight line from the pivot axis to the center of curvature of said valve seat surface is in the range between 50° and 150°.

29. A valve according to claim 28, wherein, the cylinder arranged in a horizontal plane, the pivot axis in located below the axis of the axis of the cylinder when the valve body is in said closed position with pivotal movements from said closed position being in an upward direction.

30. A valve according to claim 28, wherein a sleeve serves as the extension of the valve duct, said sleeve extending from said valve duct to the end of said housing which is downstream of said valve seat, and wherein said sleeve is provided with a longitudinal slot adapted to the width of the valve body for accommodating pivotal movement of the valve body.

31. A valve according to claim 28, wherein said mounting means includes an external thread on said valve duct which is threadably engageable with a threaded bore of an end wall of the housing.

32. A valve according to claim 28, wherein the housing is provided with flanges at its end faces, further comprising clamping bolts for clamping said flanges of said housing between pipe flanges of pipes for accommodating flow of fluid to and from said vent duct.

33. A valve according to claim 28, wherein said housing includes a tubular section disposed concentrically to the valve duct centerline, said tubular section being provided with front and rear end walls at respective opposite ends of said valve duct.

* * * * *